June 11, 1946.   L. A. WILLIAMS, JR   2,401,806
ENGINE EXHAUST FLAME ARRESTER
Filed Dec. 10, 1942   2 Sheets-Sheet 2
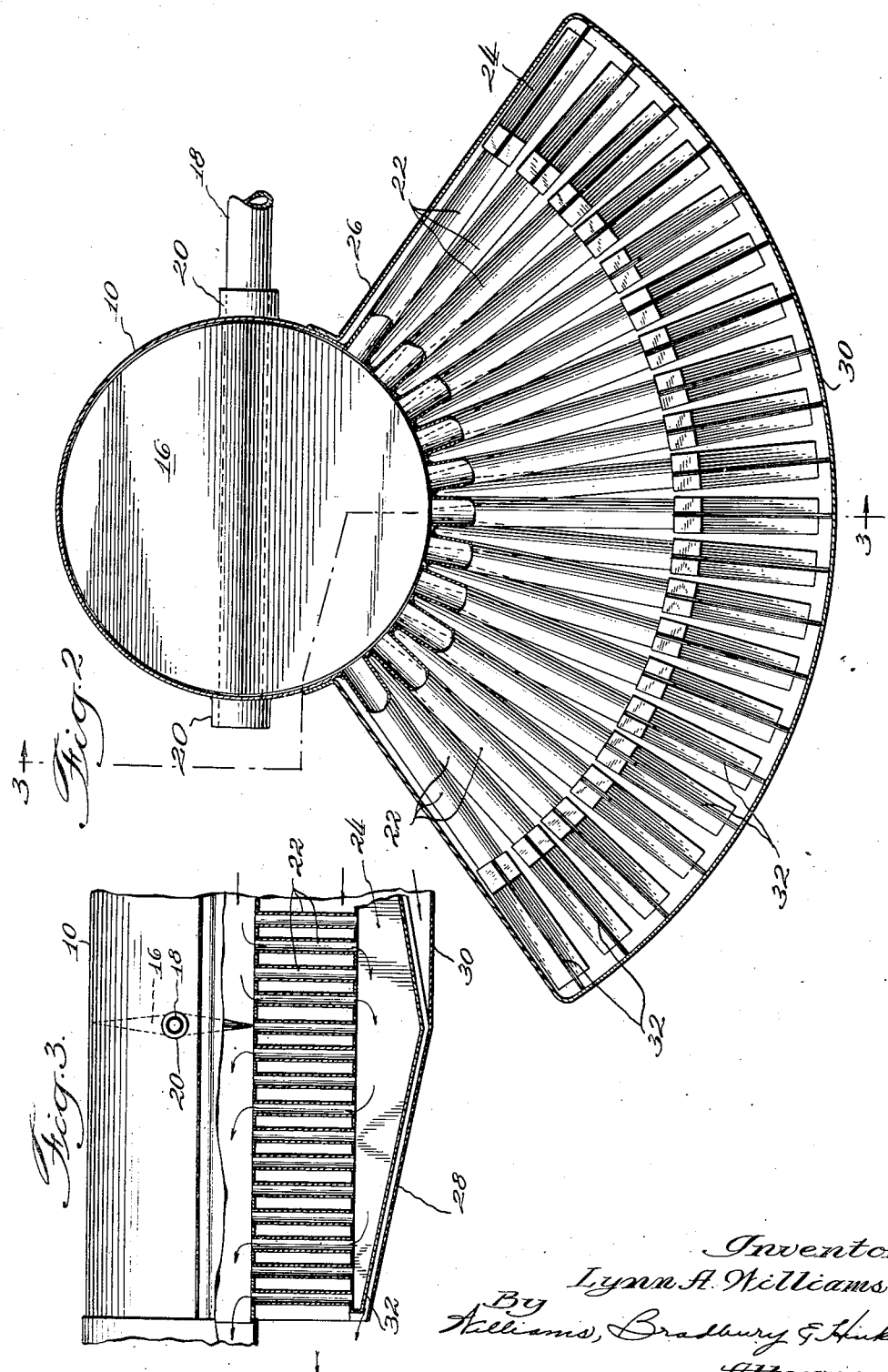
Inventor.
Lynn A. Williams Jr.
By
Williams, Bradbury & Hinkle
Attorneys Patented June 11, 1946

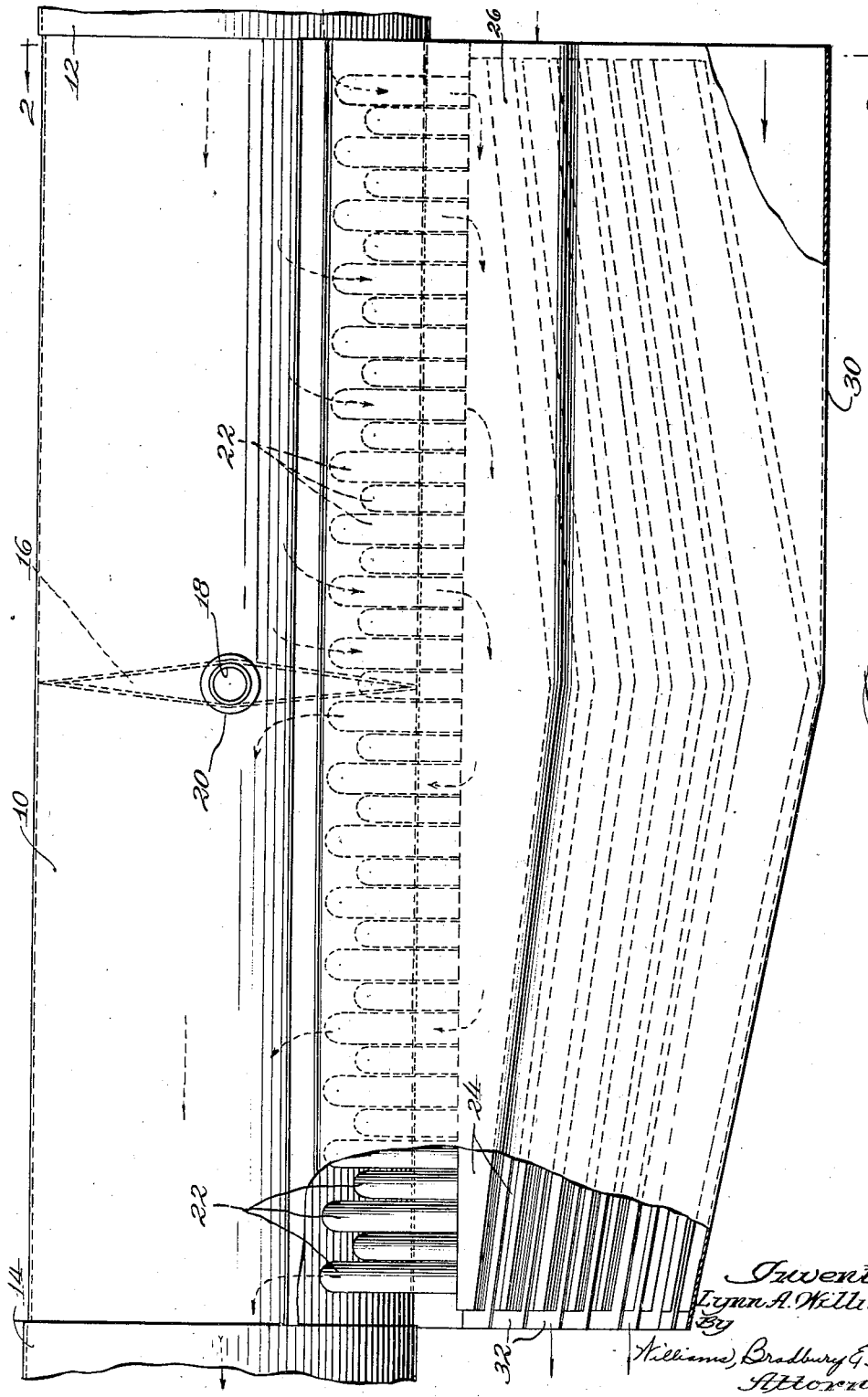

2,401,806

UNITED STATES PATENT OFFICE 2,401,806

ENGINE EXHAUST FLAME ARRESTER

Lynn A. Williams, Jr., Northfield, Ill., assignor to Stewart-Warner Corporation, Chicago, Ill., a corporation of Virginia Application December 10, 1942, Serial No. 468,460

4 Claims. (Cl. 60—31)

The present invention relates to engine exhaust flame arresters, and is more particularly concerned with the provision of mechanism to prevent burning of exhaust gases at the outlet end of aircraft engine exhaust pipes.

During the normal operation of an aircraft engine, the gasoline or other fuel is not completely converted into stable oxides within the airplane engine, for instance, an appreciable quantity of carbon monoxide normally passes through the exhaust pipe. These exhaust gases are extremely hot, and as soon as they strike the atmosphere, the carbon monoxide combines with the oxygen in the air, thus producing a flame at the outlet end of the exhaust pipe. The blue or purple flame thus normally present at the outlet of the exhaust pipe may be of no considerable importance in commercial airplanes. With military planes, however, the situation is entirely different, particularly with those it is intended to operate at night, because of the fact that the flame at the end of the exhaust pipe renders the airplane visible to attacking planes at a considerable distance.

It is the principal object of the present invention to provide novel mechanism for preventing the burning of combustible gases at the outlet end of an airplane exhaust pipe.

Yet another object of the present invention is to provide a novel flame arrester for an airplane exhaust pipe which prevents attacking planes from being able to find their quarry by reliance upon the light normally present at the outlet end of an airplane exhaust pipe.

Still another object of the present invention is to provide novel mechanism for accomplishing the above without appreciably increasing the weight or parasite drag of the airplane provided with the device.

Yet another object of the present invention is to reduce the temperature of airplane exhaust gases sufficiently so that carbon monoxide and other combustible substances normally present in exhaust gases will not burn when brought into the presence of the atmosphere.

Other objects and advantages will become apparent from the following description of a preferred embodiment of my invention illustrated in the accompanying drawings.

In the drawings, in which similar characters of reference refer to similar parts throughout the several views, Fig. 1 is a side elevation of an engine exhaust flame arrester embodying the present invention;

Fig. 2 is a transverse sectional view through the device near one end thereof. It may be considered as taken in the direction of the arrows substantially along the lines 2—2 of Fig. 1; and Fig. 3 is a longitudinal sectional view through the device. It may be considered as taken in the direction of the arrows substantially along the line 3—3 of Fig. 2.

An airplane engine is normally located within an engine nacelle and has its exhaust ports connected to an exhaust manifold. This manifold is in turn connected to one or more exhaust pipes which pass outwardly and rearwardly of the nacelle into the air stream.

The device of the present invention is intended to be located within the exhaust pipe either within the engine nacelle, or within that portion which passes rearwardly along the nacelle or beneath the lower surface of the wing. As shown in Fig. 1 it is comprised of a cylindrical portion 10 of approximately the same diameter as the exhaust pipe which is fitted at its inlet side 12 to a pipe leading to the airplane engine exhaust manifold. Its opposite, or exhaust, end 14 is connected to a length of pipe which carries the products of combustion to any suitable location where they are passed into the atmosphere. Essentially, therefore, the cylindrical section 10 may be considered as a portion of the exhaust pipe.

The cylindrical portion 10 is equipped with a damper 16 of the butterfly type, which, when in the position shown in Fig. 1, prevents the straight-through flow of the exhaust gases. This damper is located approximately midway between the two ends of the device and is mounted upon a transverse control shaft or tube 18 journaled in bearing blocks 20 welded, or otherwise suitably secured, to the side wall of the cylindrical portion 10 at opposite sides.

A multiplicity of comparatively small diameter tubes 22 extends radially outwardly from, and is welded or otherwise suitably secured to, the lower surface of the cylindrical portion 10. These tubes are arranged in transverse rows as shown in Fig. 2 with their inner ends as close together as is practical.

A second row of similar tubes is similarly arranged in a transverse row behind the tubes in the first row. In order to get the tubes in the second row as close as possible to those in the front row, the tubes in the two rows are staggered so that the inner ends of the second row tubes are secured to the cylindrical portion 10, in positions between the tubes in the front row. A third row of tubes is arranged behind the second row, with the tubes in this third row in alignment with the tubes in the first row.

Other transverse rows of tubes are similarly arranged until, as is shown in Fig. 1, the present embodiment of the invention is provided with about thirty-nine rows extending an equal distance on each side of the damper 16. At the point where each of these tubes joins the side wall of the cylindrical portion 10, the cylindrical portion is provided with an opening to permit the flow of products of combustion to, or from, the cylindrical portion through the tubes 22.

The outer ends of the small diameter tubes 22 are arranged in a plurality of longitudinally extending rows with either nineteen or twenty tubes in each of these rows in the illustrated embodiment. Separate manifolds 24 interconnect the outer ends of all of the tubes in each of the longitudinally extending rows, thus enabling products of combustion to flow outwardly through some of the tubes in any one row, along the manifold, and back up into the cylindrical portion 10 through others of the tubes in the same row (Fig. 3). These manifolds are deeper in a radial direction in a position radially outwardly from the damper than they are at the ends, because, as will be seen presently, the quantity of gas flowing through the central portion of the manifolds is greater than that at the ends.

The longitudinally extending, fan-shaped structure comprised of the tubes 22 and manifolds 24 is enclosed within a sheet metal shroud 26, which embraces the fan-shaped structure both at its radially extending sides and around the circumferential portion. The rearward portion of this shroud slopes upwardly from its central point as indicated at 28, so as closely to follow the tapered outer surfaces of the manifolds 24. The forward portion 30 of the shroud, however, extends straight forwardly rather than following the slope of the lower surfaces of the manifolds 24, and thus provides a scoop, which is located in the air stream. Air is caught in this scoop and is forced to flow rearwardly around the tubes 22 and manifolds 24 and thence out at the rearward end of the shroud.

Preferably, the portions of the structure which become quite hot are formed of sheet metal and tubing of stainless steel or some other heat and corrosion resisting material. The shroud may be formed of aluminum or aluminum alloy. The manifolds may be constructed in any suitable manner—those shown being formed in halves and joined along longitudinally extending medial lines by welding, thus providing fins 32 along the lower edges of the manifolds.

The device operates in the following manner: Under conditions where a flame at the exhaust pipe is not objectionable, the damper 16 may be placed in its open position, thereby permitting the exhaust gases to flow straight through the cylindrical portion 10 to the atmosphere. When it is desired to eliminate the flame, such as when operating at night over unfriendly territory, the damper 16 is swung to its closed position, thus causing the products of combustion which enter the cylindrical portion 10 to flow outwardly through the small diameter tubes 22 located upstream of the damper 16. These gases, after passing outwardly through these tubes, flow rearwardly through the several manifolds 24 and back up into the cylindrical portion 10 through the group of small diameter tubes located downstream of the damper 16; they then pass outwardly through the airplane exhaust pipe to the atmosphere. While the exhaust gases are passing through the small diameter tubes 22 and manifolds 24, they are brought into heat exchange relation to the air flowing through the shroud 26. The temperature of the gases is, therefore, reduced considerably, at least sufficiently to bring the temperature to such a point that ignition will not take place when the exhaust gases are mixed with an additional quantity of fresh air at the outlet end of the engine exhaust pipe. The gases, therefore, pass into the atmosphere without producing a flame which might betray the presence of the aircraft.

In the device shown, a large number of small diameter tubes 22 are used, inasmuch as this device is intended to be operated in conjunction with an aircraft engine of a high horsepower output. Modifications, of course, will be made in the apparatus to adapt it to the size of engine with which it operates. When the device is used with smaller engines, less heat exchange needs take place, and this can be accomplished in a number of manners, for instance, the tubes 22 can be shortened somewhat, or fewer numbers of these tubes can be used together with, or without, fewer numbers of the manifolds 24. On the other hand, if the device is used with engines of higher horsepower output, the unit should be designed to have greater heat exchange capacity.

While I have shown and described a particular embodiment of my invention, it will be apparent to those skilled in the art that numerous modifications and variations may be made without departing from the underlying principles of the invention. I therefore desire, by the following claims, to include within the scope of the invention all such modifications and variations by which substantially the results thereof may be obtained by substantially the same or equivalent means.

I claim:

1. An internal combustion engine exhaust flame arrester comprising a tubular portion adapted to be connected into the exhaust line of an internal combustion engine, restricting means located within said tubular portion having a plurality of openings in the side wall thereof, some of said openings being located upstream of said restricting means and others of said openings being located downstream of said restricting means, a plurality of heat exchange tubes associated with said openings mounted on said tubular portion, said openings and said tubes being arranged in rows longitudinal of said tubular portion, each of said rows being offset with respect to the adjacent row on either side, and plurality of manifolds, each of said manifolds connecting the outer ends of all of the tubes in a single row.

2. An internal combustion engine exhaust flame arrester comprising a tubular portion adapted to be connected into the exhaust line of an internal combustion engine, restricting means located within said tubular portion having a plurality of openings in the side wall thereof, some of said openings being located upstream of said restricting means and others of said openings being located downstream of said restricting means, a plurality of heat exchange tubes associated with said openings mounted on said tubular portion, said openings and said tubes being arranged in rows longitudinal of said tubular portion, each of said rows being offset with respect to the adjacent row on either side, plurality of manifolds, each of said manifolds connecting the outer ends of all of the tubes in a single row, and means to direct a current of cooling air over said tubes and said manifolds.

3. An internal combustion engine exhaust flame arrester comprising a tubular portion adapted to be connected into the exhaust line of an internal combustion engine, restricting means located within said tubular portion for restricting the flow of gas through said portion, said tubular portion having a plurality of openings in the side wall thereof, some of said openings being located upstream of said restricting means and others of said openings being located downstream of said restricting means, a plurality of heat exchange tubes associated with said openings mounted on said tubular portion, all of said tubes being of substantially the same length, said openings and said tubes being arranged in rows longitudinal of said tubular portion, each of said rows being offset with respect to the adjacent row on either side, and a plurality of tapered manifold sections, each of which has its greatest depth radially opposite said restricting means, and each of said manifolds connecting the outer ends of all of said tubes in a single row.

4. An internal combustion engine exhaust flame arrester comprising a tubular portion adapted to be connected into the exhaust line of an internal combustion engine, restricting means located within said tubular portion for restricting the flow of gas through said portion, said tubular portion having a plurality of openings in the side wall thereof, some of said openings being located upstream of said restricting means and others of said openings being located downstream of said restricting means, a plurality of heat exchange tubes associated with said openings mounted on said tubular portion, all of said tubes being of substantially the same length, said openings and said tubes arranged in rows longitudinal of said tubular portion, each of said rows being offset with respect to the adjacent row on either side, a plurality of tapered manifold sections, each of which has its greatest depth radially opposite said restricting means, each of said manifolds connecting the outer ends of all of said tubes in a single row, and means to direct a current of cooling air over said tubes and said manifolds.

LYNN A. WILLIAMS, Jr.